SEQUENTIAL TO SIMULTANEOUS CONVERSION SYSTEM

Filed Sept. 21, 1966 4 Sheets-Sheet 1

INVENTOR
YASUMASA SUGIHARA
By Linton and Linton
ATTORNEYS

INVENTOR
YASUMASA SUGIHARA
By Linton and Linton
ATTORNEYS

April 21, 1970 YASUMASA SUGIHARA 3,507,982

SEQUENTIAL TO SIMULTANEOUS CONVERSION SYSTEM

Filed Sept. 21, 1966 4 Sheets-Sheet 3

INVENTOR
YASUMASA SUGIHARA
By Linton and Linton
ATTORNEYS

INVENTOR
YASUMASA SUGIHARA
By Linton and Linton
ATTORNEYS

United States Patent Office 3,507,982
Patented Apr. 21, 1970

3,507,982

SEQUENTIAL TO SIMULTANEOUS CONVERSION SYSTEM

Yasumasa Sugihara, Kawasaki-shi, Japan, assignor to The General Corporation, Kanagawa-ken, Japan, a corporation of Japan Filed Sept. 21, 1966, Ser. No. 581,021
Int. Cl. H04r 9/42
U.S. Cl. 178—5.4 2 Claims

ABSTRACT OF THE DISCLOSURE

Apparatus for converting line sequential color signals to simultaneously presented color signals for display by a shadow mask picture tube. Three ring counters generate square wave gating signals which are applied to three gates corresponding to the three colors being displayed. Two of the sequential color signals are applied through delay circuits before gating to enable a simultaneous presentation.

This invention relates to a colour television reproducing system, and more particularly to a colour television receiver having a three-electron gun type of picture tube for the reproduction of a televised colour image signal information.

In the copending U.S. application of Kunio Matsui Ser. No. 452,501 filed May 3, 1965, now abandoned the inventor introduced a circuit means for converting the NTSC signal into a line-sequential signal for recording on a monochrome video tape recorder and monitoring on a colour television receiver of the line-sequential type utilizing a single electron gun picture tube. The inventor later discovered that such line-sequential colour image when reproduced on a single-electron gun type of picture tube is susceptible to line crawl, and this difficulty is more critical with larger television receivers of the line-sequential type.

It is therefore the object of the present invention to eliminate the above line crawl problem encountered with a colour television receiver of the line-sequential type.

It is another object of the invention to provide a new and useful means for converting the colour image signal from line-sequential to simultaneous.

These objects and other features of the invention will become apparent from the following description taken in connection with the accompanying drawings in which.

Figures 1, 2:
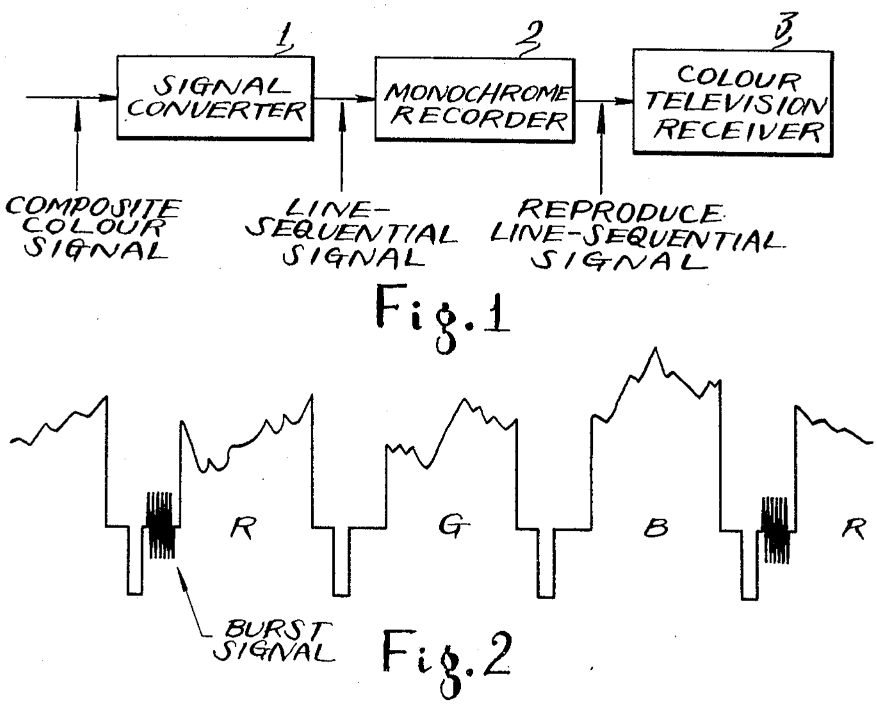
FIG. 1 is a block diagram illustrating a typical example of the equipment arrangement for recording and reproducing a colour television signal according to the invention.
FIG. 2 is a waveform diagram illustrating a line-sequential colour television signal.

Reference to the block diagram of FIG. 1 shows a signal converter unit 1 for converting a composite video signal into a line-sequential colour signal information, a monochrome video tape recorder 2 for recording the line-sequential colour image signal from the converter 1 and a colour television receiver 3 for reproducing the line-sequential colour image signal from the recorder 2.

Illustrated in FIG. 2 is the waveform of the output signal from the signal converter 1, detailed account of this unit being given in said copending U.S. application. The output of the converter 1 comprises a series of primary colours arranged in the sequence of red, green, blue . . . and repeating in this order with each colour assigned to each horizontal scanning line. A burst signal of suitable frequency is inserted at the back porch of the horizontal synchronizing signal for every three horizontal scanning lines so as to obtain a synchronization of the primary colour signals. Such line-sequential colour signal is analogous both in frequency component and waveform to a monochrome television signal and can be recorded on an ordinary monochrome video tape recorder with satisfactory results. The recorder 2 shown in FIG. 1 is of any conventional magnetic video recording apparatus, and hence requires no further description.

Figure 3:
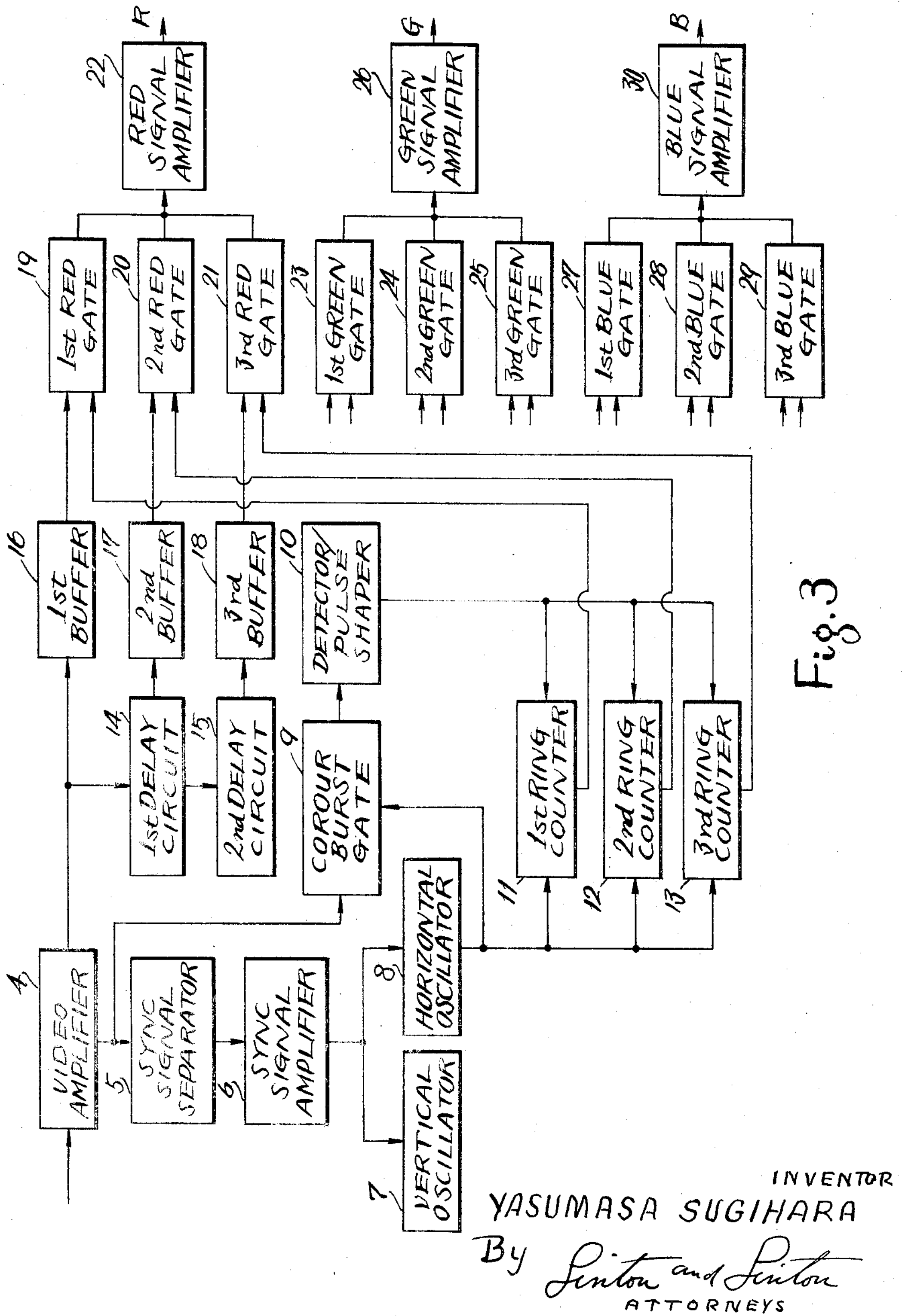
FIG. 3 is a block diagram illustrating a colour television receiver embodying the invention.

Turning to the colour television receiver 3 embodying the invention, it includes a shadow-mask, three-electron gun type of cathode-ray tube for purposes of illustration, and has a circuit arrangement such as illustrated in FIG. 3.

Designated at 4 is a video amplifier; at 5 is a synchronizing signal separator; at 6 is a synchronizing signal amplifier; at 7 is a vertical oscillator/deflector; at 8 is a horizontal oscillator/deflector; at 9 is a colour burst gate circuit, and at 10 is a detector/three-horizontal scanning line drive. These circuits are identical with those incorporated in the standard colour television receiver and hence, will require no further description.

Figure 4:
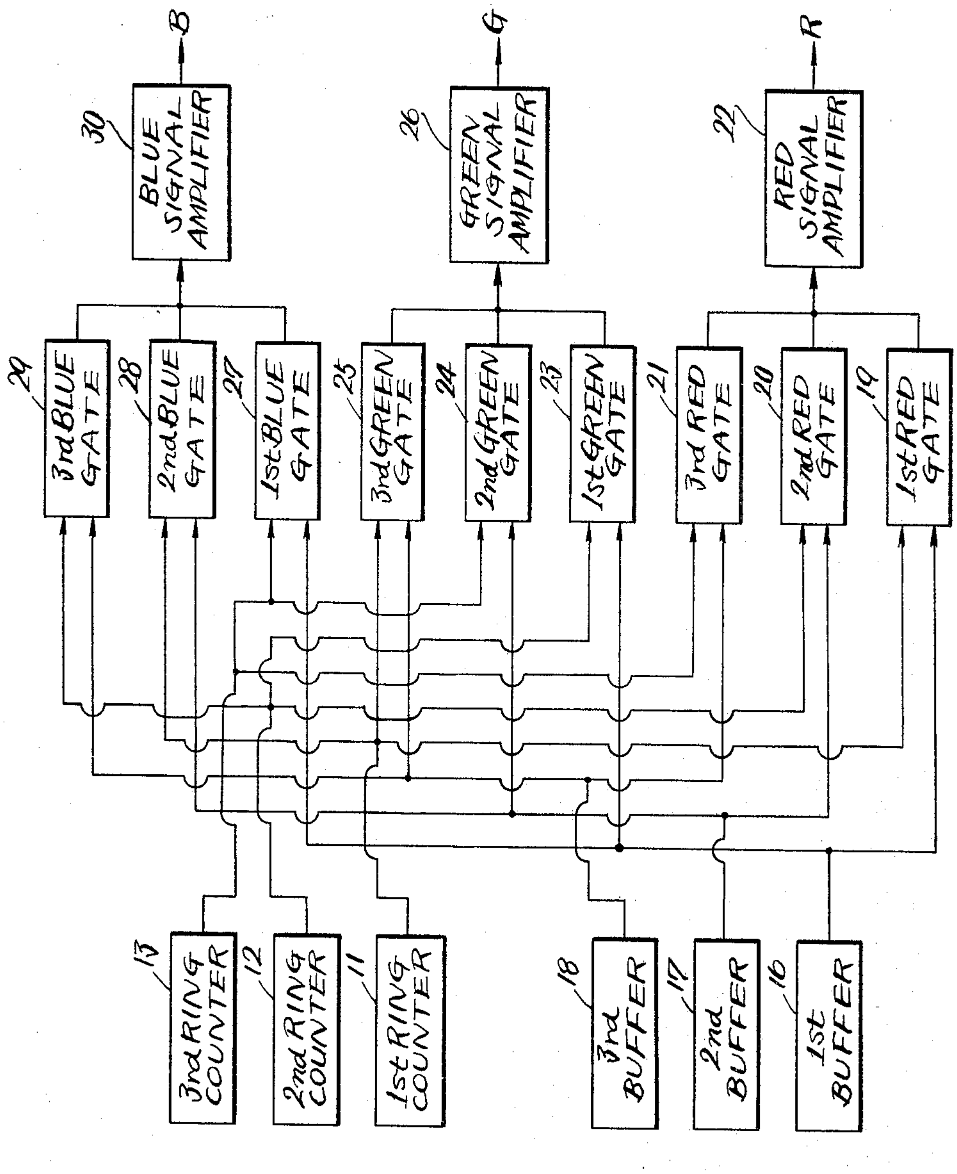
FIG. 4 is a block diagram illustrating three sets of gate circuits associated with the receiver of FIG. 3.

The colour television receiver 3 under consideration further comprises a set of ring counters 11, 12 and 13 adapted to develop by turns a square wave having a cycle corresponding to three horizontal scanning periods; delay circuits 14 and 15 adapted respectively to provide a colour image signal with a delay corresponding to one horizontal scanning line; buffers 16, 17 and 18 adapted respectively to amplify each of the primary colour signals or chrominance signals; a first set of gate circuits 19, 20 and 21 connected with the outputs of the ring counters 11, 12 and 13 respectively and further with the outputs of the buffers 16, 17 and 18 respectively and adapted to derive specifically a red signal (R); a second set of gate circuits 23, 24 and 25 arranged in a manner similar to the first set of gate circuits and adapted to develop specifically a green signal (G); a third set of gate circuits 27, 28 and 29 similar to the first and second set for developing specifically a blue signal (B); and a set of chrominance signal amplifiers 22, 26 and 30 for respectively amplifying the outputs of the three sets of gate circuits to a level sufficient to drive the picture tube (not shown) of the receiver 3. The sets of gate circuits just mentioned are more clearly illustrated at FIG. 4 as to their respective connections in the receiver circuit.

Figure 5:
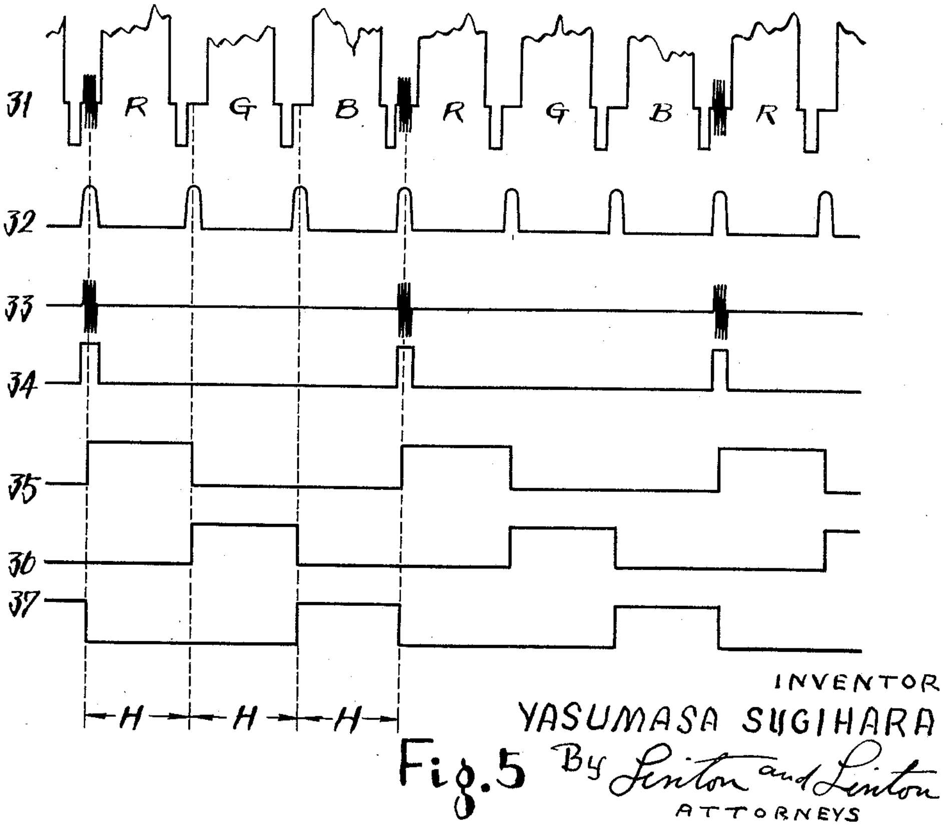
FIG. 5 illustrates the waveform of a gate pulse obtained from a ring counter incorporated in the receiver of FIG. 3.

With this arrangement, let it be assumed that a colour television signal information of the line-sequential type of the nature illustrated in FIG. 2 is introduced into the video amplifier 4 whose output having a waveform such as shown for example at 31 in FIG. 5 is supplied to the colour burst gate 9. The gate receives a horizontal gate pulse 32 (see FIG. 5) from the horizontal oscillator 8 and conducts during this pulse period for passing the amplifier output therethrough. The output of the burst gate 9 appears something like that shown at 33 in FIG. 5. This gate output is subjected to envelop-detection by the pulse shaper 10 thereby obtaining a pulse such as shown at 34 in FIG. 5. The ring counter 11, 12 and 13 being energized by the horizontal pulse from the horizontal oscillator 8, produce waveforms 35, 36 and 37, respectively. In order to maintain a constant time relationship of these three waveforms with respect to the burst signal, there is added the pulse 34 from the shaper 10 as a reset pulse whereby a synchronization of the chrominance signals in the receiver system is achieved.

Figure 6:
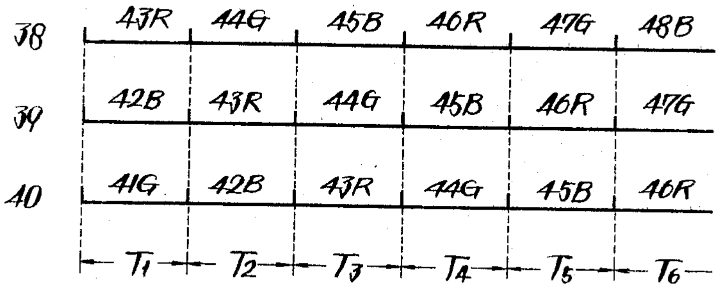
FIG. 6 illustrates the arrangement of three primary colour signals obtained from the respective gate circuits.

The output of the video amplifier 4 is also supplied to the first and second delay circuits 14 and 15 connected respectively to the inputs of the second and third buffers 17 and 18, so that the input signal to the second buffer 17 comes one horizontal scan line ahead of the input signal to the first buffer 16, while the input signal to the third buffer 18 is positioned two horizontal scan lines ahead of the input signal to the first buffer 16. The respective outputs of the buffers 16, 17 and 18 are identified by the corresponding primary colour signals in FIG. 6 where the reference numeral 38 denotes the output of the first buffer 16, the numeral 39 denotes the output of the second buffer 17 and the numeral 40 denotes the output of the third buffer 18. Take a red signal 43R for instance; this signal appears at the instant $T_1$ with respect to the first buffer 16, at the instant $T_2$ with respect to the second buffer 17 and at the instant $T_3$ with respect to the third buffer 18.

Figure 7:
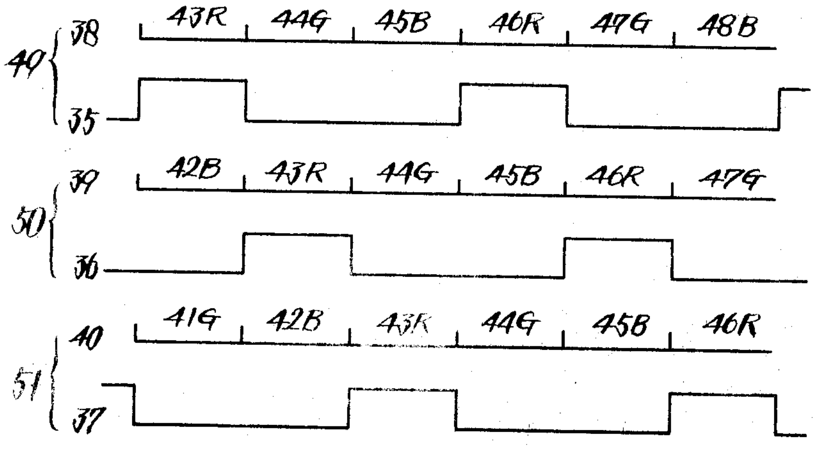
FIGS. 7 and 8 illustrate the relationship between the primary colour signals and the associated gate signals.

The set of first, second and third gate circuits 19, 20 and 21 are adapted to sample the red signal component from the line-sequential signal and produce a series of red colour signals R for application to the red signal amplifier 22. To illustrate this according to FIG. 7, a line-sequential signal 38 enters the first gate 19 simultaneously as does a gate signal 35 from the first ring counter 11, so that the output of the gate 19 appears at the instants $T_1, T_4$ . . . and so on which carries the red colour component R alone. Similarly, to the second gate 20 is applied a line-sequential signal 39 simultaneously as is a gate signal 36 from the second ring counter 12, so that the output of the gate 20 is always representative of a red colour signal R as appearing at the instants $T_2, T_5$ . . . and so on. Similar is the case with the third gate 21 whose output appears at the instants $T_3, T_6$ . . . and so on which coincides with the red colour component cycle of the composite line-sequential signal. Designated at 49, 50 and 51 in FIG. 7 are the respective inputs of the first, second and third gate circuits.

Figure 8:
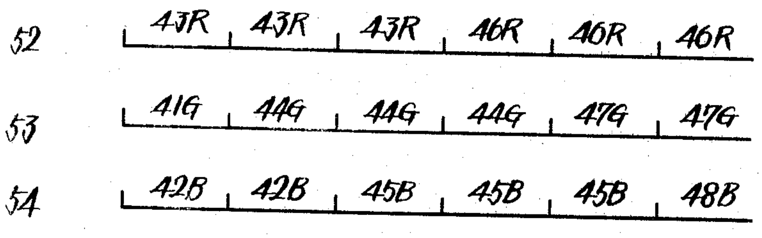

By connecting the outputs of the three gate circuits 19, 20 and 21 under a common load condition, it is possible to obtain a series of red colour signals repeating with the same colour three times for every three horizontal scanning periods. This series of signals may be amplified at the amplifier 22 for application in the usual manner to the beam control electrode for a red electron gun (not illustrated) in the shadow-mask colour picture tube. A similar process applies to the outputs of the green signal gate circuits 23, 24 and 25 and equally to the outputs of the blue signal gate circuits 27, 28 and 29, both signal gate outputs being amplified by the respective amplifiers 26 and 30 for application respectively to the green and blue signal electron guns in the shadow-mask colour tube. These red, green and blue series of signals, as respectively designated at 52, 53 and 54 in FIG. 8, are no longer line-sequential but are aligned in a simultaneous fashion which may be readily applied to the conventional shadow-mask colour tube for reproduction of the televised colour image information on the fluorescent screen of the tube. Here, the only difference from the usual shadow-mask tube operation is that the serially arranged signal, for example the red signal 52 according to the invention has a three-horizontal line coverage representative of three similar red signals 43R. This would, however, present no defects in the reproduced picture that are perceptible to the eye of the viewer, as it has been proven in the SECAM and PAS systems that a signal information spanning over two adjacent scanning lines is substantially homogeneous. Therefore, one and the same signal may be distributed equally to three scanning lines without effecting the reproduced image for all practical purposes. Based on this fact, it will be appreciated that two scanning lines suffice for assignment to a given one of the primary colours while the third scanning line may be blanked off. This approach can further simplify the circuit construction of the colour television receiver 3 according to the invention.

It will be also appreciated that while the invention has been described in connection with the line-sequential primary colour signals red, green and blue, the theory herein above discussed can be applied similarly to sequential Y-, I- and Q-signals, or three sequential Y-signal, $R-Y$ signal and $B-Y$ signal.

It will be further appreciated that the invention may be equally applied to the SECAM and PAL television systems.

What I claim is:

1. In a color television receiver having a shadow-mask color picture tube for reproducing simultaneously applied color signals from line-sequential recorded image signals, the combination comprising a video amplifier for amplifying a line-sequential color television signal, a first delay circuit connected to the output of said video amplifier and for delaying the output signals thereof by one horizontal scanning period, a second delay circuit connected to the output of said first delay circuit and for delaying the output signals of said video amplifier by two horizontal scanning periods, three ring counters for generating by turns a square wave having a pulse width of one horizontal scanning period in each three horizontal scanning period with said square wave being produced in each different horizontal scanning period of three horizontal scanning periods, gate circuits for red signals connected to each output of said video amplifier and of said delay circuits and for passing the continued red signals from said each output in each three horizontal scanning period by means of the output signals of said three ring counters, gate circuits for blue signals connected to each output of said video amplifier and of said delay circuits and for passing the continued blue signals from each output in each three horizontal scanning period by means of the output signals of said three ring counters, gate circuits for green signals connected to each output of said video amplifier and of said delay circuits and for passing the continued green signals from said each output in each signals of said three ring counters, and amplifiers for amplifying the respective outputs of said each gate circuit to a level sufficient to reproduce a color image on said color picture tube.

2. In a color television receiver having a shadow-mask color picture tube for reproducing simultaneously applied color signals from line-sequential recorded image signals, the combination comprising a video amplifier for amplifying a line-sequential color television signal, a first delay circuit connected to the output of said video amplifier and for delaying the output signals thereof by one horizontal scanning period, a second delay circuit connected to the output of said first delay circuit and for delaying the output signals of said video amplifier by one horizontal scanning periods, two ring counters for generating a square wave having a pulse width of one horizontal scanning period in each different horizontal scanning period with said square wave being produced in each different horizontal scanning period of three horizontal scanning periods, gate circuits for red signals connected to each output of said video amplifier and of said circuits and for passing the red signals from said each output in each horizontal scanning period by means of the output signals of said two ring counters, said red signals being blanked off in one horizontal scanning period corresponding to a blanking portion of said square wave, gate circuits for blue signals connected to each output of said video amplifier and of said delay circuits and for passing the blue signals from said each output in each horizontal scanning period by means of the output signals of said two ring counters, said blue signals being blanked off in one horizontal scanning period corresponding to a blanking portion of said square wave, gate circuits for green signals connected to each output of said video amplifier and of said delay circuits and for passing the green signals from said each output in each horizontal scanning period by means of the output signals of said two ring counters, said green signals being blanked off in one horizontal scanning period corresponding to a blanking portion of said square wave, and amplifiers for amplifying the respective outputs of each gate circuit to a level sufficient to reproduce a color image of said color picture tube.

References Cited

UNITED STATES PATENTS 3,267,211 8/1966 Melchior ------------ 178—5.4

ROBERT L. GRIFFIN, Primary Examiner

R. L. RICHARDSON, Assistant Examiner